United States Patent
Satish et al.

(10) Patent No.: US 8,473,924 B1
(45) Date of Patent: Jun. 25, 2013

(54) ENABLING EFFICIENT USE OF AN ENDPOINT

(75) Inventors: Sourabh Satish, Fremont, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 1190 days.

(21) Appl. No.: 12/340,559

(22) Filed: Dec. 19, 2008

(51) Int. Cl.
*G06F 9/44* (2006.01)
*G06F 9/45* (2006.01)

(52) U.S. Cl.
USPC .......... 717/130; 717/131; 717/154; 717/155; 717/156; 717/157; 717/158

(58) Field of Classification Search
None
See application file for complete search history.

(56) References Cited

U.S. PATENT DOCUMENTS

| | | | | |
|---|---|---|---|---|
| 5,787,285 | A * | 7/1998 | Lanning | 717/130 |
| 6,340,977 | B1 * | 1/2002 | Lui et al. | 715/709 |
| 6,381,735 | B1 * | 4/2002 | Hunt | 717/158 |
| 6,957,422 | B2 * | 10/2005 | Hunt | 717/130 |
| 7,356,802 | B2 * | 4/2008 | de Sutter et al. | 717/108 |
| 7,418,718 | B2 * | 8/2008 | Liu et al. | 719/328 |
| 7,716,643 | B2 * | 5/2010 | Goldin | 717/124 |
| 8,141,051 | B2 * | 3/2012 | Huang et al. | 717/127 |
| 8,176,475 | B2 * | 5/2012 | Kosche et al. | 717/127 |
| 8,196,115 | B2 * | 6/2012 | Dimpsey et al. | 717/128 |
| 2004/0210877 | A1 * | 10/2004 | Sluiman et al. | 717/130 |
| 2005/0183074 | A1 * | 8/2005 | Alexander et al. | 717/144 |
| 2007/0050604 | A1 * | 3/2007 | Ferren et al. | 712/226 |
| 2007/0050606 | A1 * | 3/2007 | Ferren et al. | 712/227 |
| 2007/0050719 | A1 * | 3/2007 | Lui et al. | 715/762 |
| 2007/0106437 | A1 * | 5/2007 | Kim et al. | 701/29 |
| 2007/0106772 | A1 * | 5/2007 | Johnson et al. | 709/223 |
| 2007/0220495 | A1 * | 9/2007 | Chen et al. | 717/130 |
| 2008/0127149 | A1 * | 5/2008 | Kosche et al. | 717/158 |

OTHER PUBLICATIONS

"FastScale Optimizes Software Stacks for Amazon Elastic Compute Cloud"—http://vmblog.com/archive/2009/04/06/fastscale-optimizes-software-stacks-for-amazon-ela . . . .*
"FastScale Technology—Composer Suite," 2007-2008, FastScale Technology, Inc., 2 pages [Online] [Retrieved on Aug. 20, 2009] Retrieved from the Internet<URL:http://www.fastscale.com/technology/composer.shtml>.

* cited by examiner

*Primary Examiner* — Henry Tsai
*Assistant Examiner* — Jing-Yih Shyu
(74) *Attorney, Agent, or Firm* — Fenwick & West LLP

(57) ABSTRACT

Application profiles for applications stored on the endpoint are defined. An application profile identifies components on the endpoint associated with an application with which the application profile is associated. Applications on the endpoint accessed by a user to perform a task are monitored. A task profile associated with the task is created and stored, the task profile associated with the application profiles for the applications accessed by the user to perform the task.

20 Claims, 4 Drawing Sheets

ENABLING EFFICIENT USE OF AN ENDPOINT

BACKGROUND OF THE INVENTION

1. Field of the Invention

This invention pertains in general to computer systems and in particular to efficiently using the resources of a computer system.

2. Description of the Related Art

Typically when a user installs an application on a computer, the application installs accompanying components (e.g., drivers and services) that are needed to run the application. These components are often configured to be loaded whenever the computer is running, even if the accompany applications are not being used by the user. The components are configured in this way in order to provide the user with the flexibility to run the accompanying applications at any time.

Over time, many applications and associated components are installed on the typical computer. Each installed component consumes the computer's resources (e.g., memory, central processing unit). While an individual component may consume only minimal resources when its accompanying application is not executing, the cumulative effect of many such components can have a significant impact on the responsiveness and performance of the computer. Accordingly, there is a need in the art for a way to execute multiple applications on a computer without suffering the performance degradation described above.

BRIEF SUMMARY OF THE INVENTION

The above and other needs are met by a computer-implemented method and computer program product for creating a task profile to efficiently use the resources of an endpoint. Embodiments of the computer-implemented method comprise defining application profiles for applications stored on the endpoint. An application profile identifying components on the endpoint associated with an application with which the application profile is associated. Applications on the endpoint accessed by a user to perform a task are monitored. A task profile associated with the task is created and stored, the task profile associated with the application profiles for the applications accessed by the user to perform the task.

Embodiments of the computer program product also comprise an application profile module configured to define application profiles for applications stored on the endpoint, an application profile identifying components on the endpoint associated with an application with which the application profile is associated. The computer program product further comprises a task profile module configured to monitor applications on the endpoint accessed by a user to perform a task, create a task profile associated with the task, the task profile associated with the application profiles for the applications accessed by the user to perform the task, and store the task profile.

The above and other needs are also met by a computer-implemented method for efficiently using the resources of an endpoint. Embodiments of the computer-implemented method comprise receiving a request from a user of the endpoint to perform a task on the endpoint. A stored task profile associated with the task is identified, the task profile associated with one or more application profiles for applications used by the user to perform the task, an application profile identifying components on the endpoint associated with an application. The endpoint is configured to execute the components identified by the one or more application profiles associated with the task profile.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
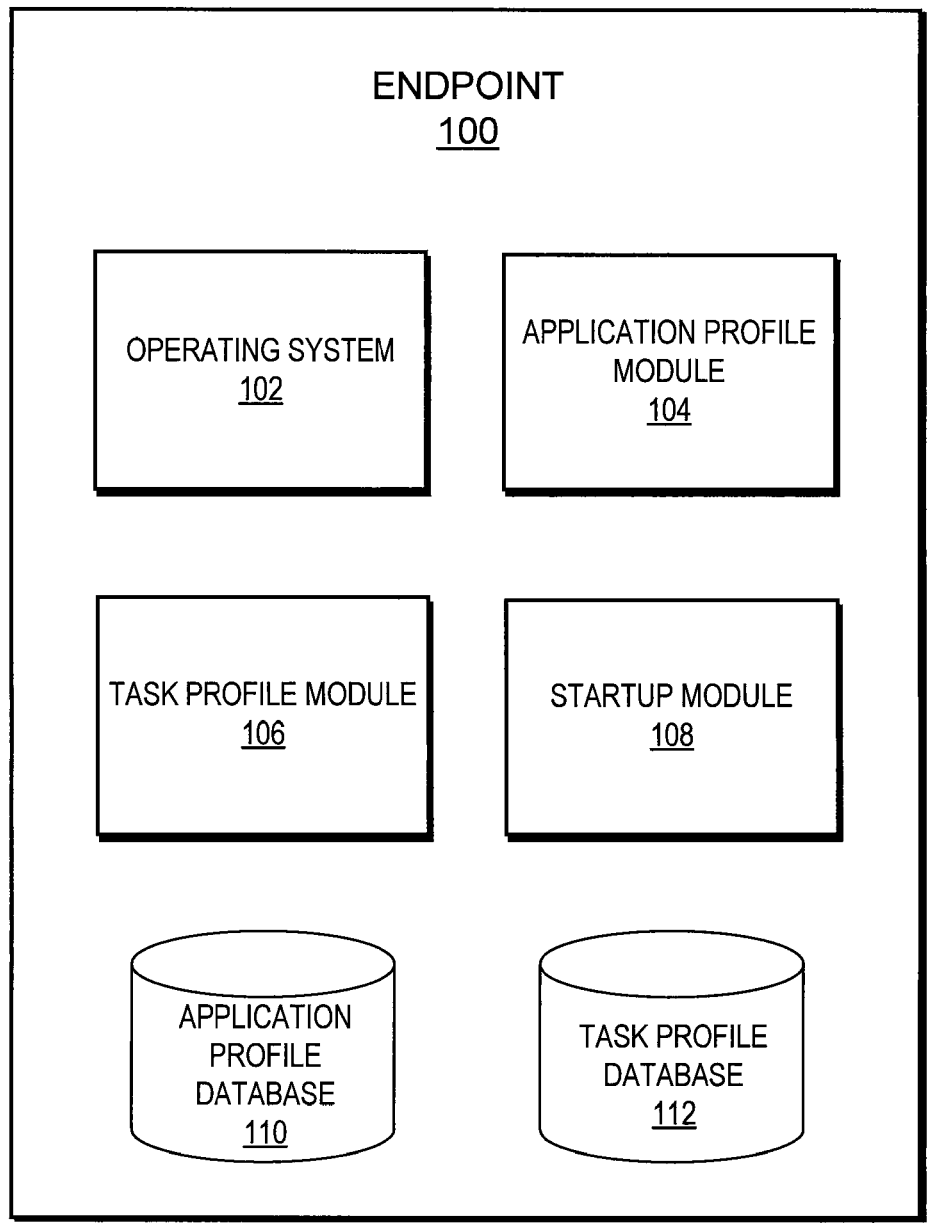
FIG. 1 is a high-level block diagram of an endpoint according to one embodiment.

FIG. 1 is a high-level block diagram of an endpoint 100 according to one embodiment. In one embodiment, the endpoint 100 is a computer used by one or more users to perform activities including downloading, installing, and/or executing files and browsing web sites on a network, such as the Internet. The endpoint 100, for example, can be a personal computer. In other embodiments, the endpoint 100 is a device other than a computer, such as a personal digital assistant (PDA), a mobile telephone, a pager, a television "set-top box," etc.

Multiple applications that may be used by a user are installed on the endpoint 100. These applications can include, for example, a web browser, a word processing program, a spreadsheet program, and a media player. Each application has associated components that must be loaded on the endpoint 100 (i.e., loaded into memory and executed) for the application to run successfully. Examples of these components include dynamic link libraries (DLLs), drivers, executable files, services, COM files, operating system files, tasks, system configuration changes, and associated dependencies. Typically, an application installs its components as part of its own installation. In addition, the application also configures the operating system of the endpoint 100 to load the components when the operating system is booted.

At any given point in time, some components loaded on the endpoint 100 are not needed because their associated applications are not being executed. These unneeded components can safely be removed (i.e., the execution of the components can be terminated) without negatively affecting the applications that are being executed. In fact, removing unneeded components can improve the operation of the endpoint 100 because it makes more of the endpoint's resources available for the executing applications.

In one embodiment, the endpoint 100 operates in at least two modes, a "learning" mode and an "efficient" mode. The learning mode is used to learn which applications and components are required by the user for given tasks. The efficient mode is used to allow the user to perform a specific task or set of tasks. Only the applications and components required for the task are loaded by the endpoint 100 during efficient mode. Thus, the efficient mode is "efficient" because application components for unneeded applications are not loaded. Depending upon the embodiment, the endpoint 100 may operate in other modes, such as a "normal" mode where the operating system is allowed to load application components according to its normal configuration.

During learning mode, all application components installed on the endpoint 100 are allowed to load normally. Thus, the user has access to all the applications available on the endpoint 100. While in learning mode, the user uses the endpoint 100 to perform a task and the applications used by the user to carry out the task are automatically learned. For example, assume a user performs the task of doing school work on the endpoint 100. To complete this task the user uses a word processing application and a web browser application. The applications and components used by the user while carrying out the task are learned and saved in a task profile.

To activate efficient mode, one embodiment presents the user of the endpoint 100 with a task panel that lists the tasks having associated profiles. Upon the user selecting a task from the panel, the task's profile is used to configure the endpoint 100 to load only the applications and components specified by the task profile. As mentioned above, efficient mode is beneficial in that resources of the endpoint 100 are used to run only the components that are needed to complete the task.

FIG. 1 illustrates the endpoint 100 including an operating system 102, an application profile module 104, a task profile module 106, a startup module 108, an application profile database 110, and a task profile database 112. Those of skill in the art will recognize that other embodiments of the endpoint 100 can have different and/or other modules than the ones described here, and that the functionalities can be distributed among the modules in a different manner.

The operating system 102 manages the hardware and software resources of the endpoint 100. The operating system 102 performs tasks such as logging users into and out of the endpoint 100 and providing a user interface allowing the user to interact with the endpoint 100. In one embodiment, the operating system 102 controls which components, including components of the operating system 102 and of applications, are loaded by the endpoint 100 when a user logs in. However, this functionality is at least partially superseded by other modules described below in one embodiment. The operating system 102 may be any type of operating system such as MICROSOFT WINDOWS, MAC OS X, UNIX, and SOLARIS.

The application profile module 104 defines application profiles for applications installed on the endpoint 100. An application profile is associated with a particular application and describes the components associated with an application. In addition, the application profile may describe other information associated with the application, such as the locations on a storage device at which the components are stored. In one embodiment, the application profile also describes components stored on the endpoint 100 not used in executing the application.

In one embodiment, the application profile module 104 defines an application profile for every application installed on the endpoint 100. For example, upon activation the application profile module 104 can scan the endpoint 100 to identify the applications installed thereon. In another embodiment, the application profile module 104 defines profiles for only certain applications, such as applications accessed while the endpoint 100 is in learning mode.

Upon identifying an application for which a profile is to be defined, the application profile module 104 accesses an application profile database 110 to determine if an application profile for the application is already stored in the database 110. If an application profile for the application is not stored in the database 110, the application profile module 104 defines an application profile for the application.

In one embodiment, the application profile module 104 defines the application profile by obtaining a previously created application profile. The application profile module 104 can, for example, request the application profile from a remote server connected via a network such as the Internet. The application profile module 104 can also define the application profile by directly observing the application. The application profile module 104 can detect the installation of an application, and observe the components being stored on the endpoint 100 and other configuration changes made as part of the installation process. Similarly, the application profile module 104 can observe and analyze an already-installed program as it executes to identify the components of the application. The application profile module 104 can generate the application profile based on the observed information.

In one embodiment, the application profile module 104 defines the application profiles as virtual software packages for use with the ALTIRIS® SOFTWARE VIRTUALIZATION SOLUTION™ provided by SYMANTEC CORPORATION of Cupertino, Calif. Each virtual software package specifies all of the appropriate components and resources required for its associated application. The SOFTWARE VIRTUALIZATION SOLUTION allows the applications to be instantiated with all of its components and resources as layers in a manner that does not conflict with any other applications executing on the endpoint 100. When an application is not instantiated, it is as if the application is not installed on the endpoint 100.

The application profile database 110 stores applications profiles defined by the application profile module 104. The application profile database 110 may also include related information, such as default profiles for applications that are commonly installed on endpoints.

The task profile module 106 creates task profiles for tasks performed by users on the endpoint 100. In one embodiment, the task profile module 106 creates a task profile based on applications accessed by a user during a learning mode session. When the user places the endpoint 100 in learning mode, the task profile module 106 monitors the applications accessed by the user. When the user terminates the learning mode, the task profile module 106 creates a task profile based on the applications accessed by the user during the session. In one embodiment, applications accessed by the user are a subset of the applications installed on the endpoint. The application profiles of the applications accessed by the user are associated with the task profile.

In one embodiment, the task profile module 106 presents the user with an interface that the user can use to view, modify, and delete task profiles. The interface can also provide the user with the ability to manually create a task profile and associate applications with it. In one embodiment, the interface lists applications for which application profiles are defined. From the list the user can select one or more applications and associate them with a new or existing task profile. Additionally, in the interface the user can provide a name for the task profile along with other identifying information.

The task profile database 112 stores task profiles created by the task profile module 106. In one embodiment, the task profile database 112 contains additional default task profiles for tasks commonly performed on endpoints, such as a default "web browsing" task profile.

The startup module 108 controls the endpoint 100 and provides the user with an interface allowing the user to select among the various modes. In one embodiment, when the endpoint 100 is booted the startup module 108 activates the operating system 102 with a minimal configuration and presents the user with a task panel. The task panel displays the task profiles stored in the task profile database 112. In addition, the task panel also includes an option to start the endpoint 100 in learning mode. The task panel may also provide other options, such as an option to start the endpoint 100 in a "normal" mode where the endpoint 100 is booted according to its standard configuration. A difference between normal mode and learning mode is that under normal mode the applications accessed by the user are not monitored and thus no task profiles are created.

In one embodiment, the startup module 108 is configured to support multiple users. The startup module 108 provides the user with a login prompt or other means allowing the user to identify and/or authenticate himself to the startup module 108. The startup module 108 then presents the user with a task panel tailored to that user. For example, the tasks displayed on the task panel can include only tasks performed by the user.

If the user selects a task profile from the task panel, the endpoint 100 enters efficient mode. Under efficient mode, the startup module 108 analyzes the selected task profile to identify the associated application profiles. The startup module 108 uses the application profiles to identify the applications and components associated with the task. The startup module 108 configures the endpoint 100 to load only the components required by the applications associated with the tasks, thereby maximizing the resources of the endpoint 100 that are available for the task.

In one embodiment, if the application profiles are virtual software packages deployed as layers, when a task profile is selected, the startup module 108 activates the layers of applications associated with the task profile and disables the layers of other applications installed on the endpoint 100 that are not associated with the task profile. Therefore, it appears to the endpoint 100 and operating system 102 that the only applications installed on the endpoint 100 are those whose layers are activated. In another embodiment, when the user selects a task profile from the task panel, the startup module 108 instantiates a virtual machine having only the applications identified by the task profile.

Figure 2:
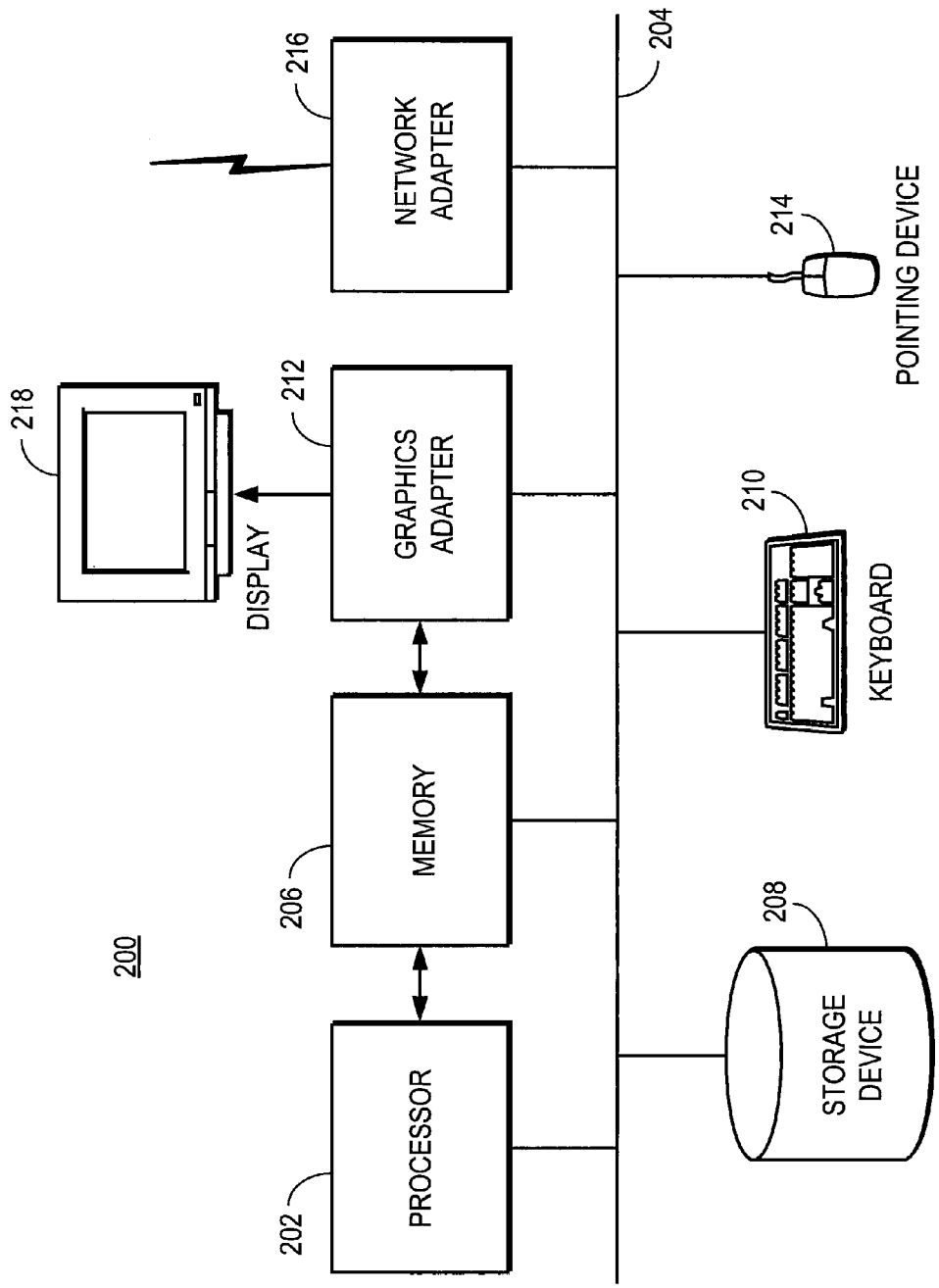
FIG. 2 is a high-level block diagram illustrating the hardware components of the endpoint according to one embodiment.

FIG. 2 is a high-level block diagram illustrating a typical computer 200 for use as an endpoint 100 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is a computer-readable storage medium, and in one embodiment, is a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a network, such as the Internet.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

Figure 3:
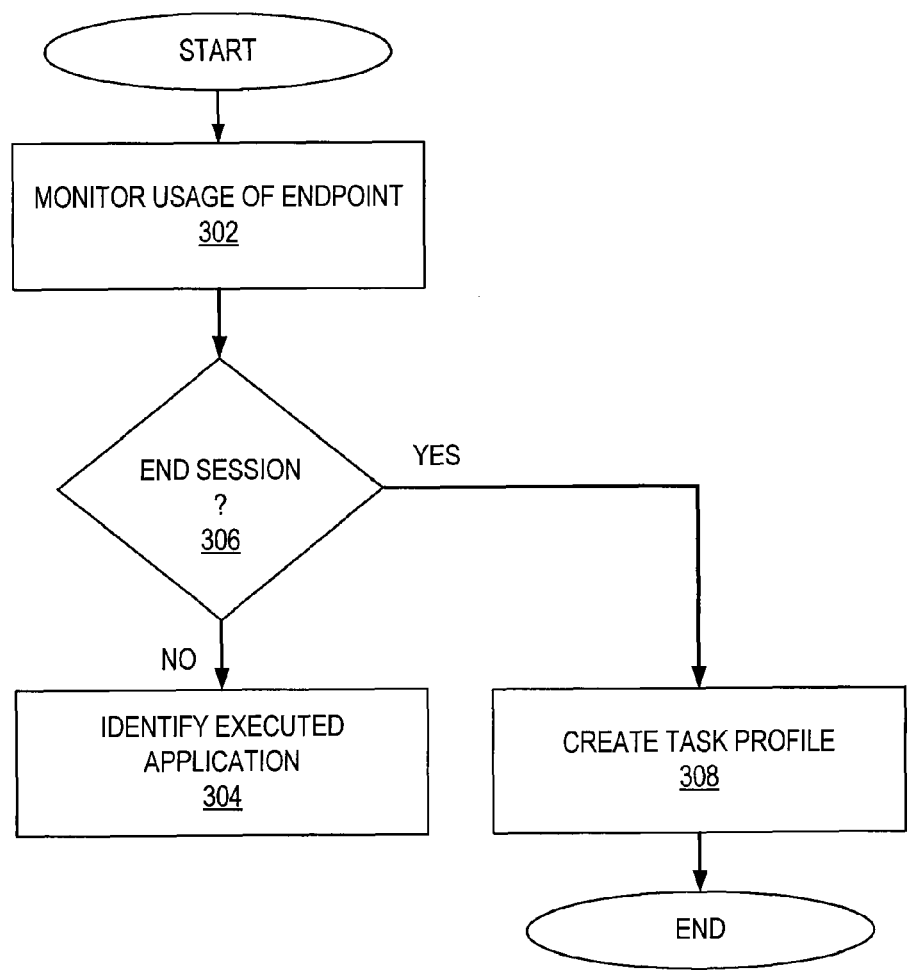
FIG. 3 is a flowchart illustrating steps performed by the task profile module when the endpoint is in learning mode according to one embodiment.

FIG. 3 is a flowchart 300 illustrating steps performed by the task profile module 106 when the endpoint 100 is in learning mode according to one embodiment. Other embodiments perform the illustrated steps in different orders, and/or perform different or additional steps. Additionally, in other embodiments, some or all of the steps may be performed by different modules.

When a user starts the endpoint 100 in learning mode, the task profile module 106 automatically monitors 302 the usage of the endpoint 100. Specifically, the task profile module 106 identifies 304 any applications executed by the user during the session. When 306 the user indicates that the learning mode session is over, the task profile module 106 creates 308 a task profile for the session and stores it in the task profile database 112. The task profile references the application profiles for the applications executed during the session. In certain situations, such as when a new application is installed during learning mode, the application profile module 104 may need to define a new application profile for an application.

Figure 4:
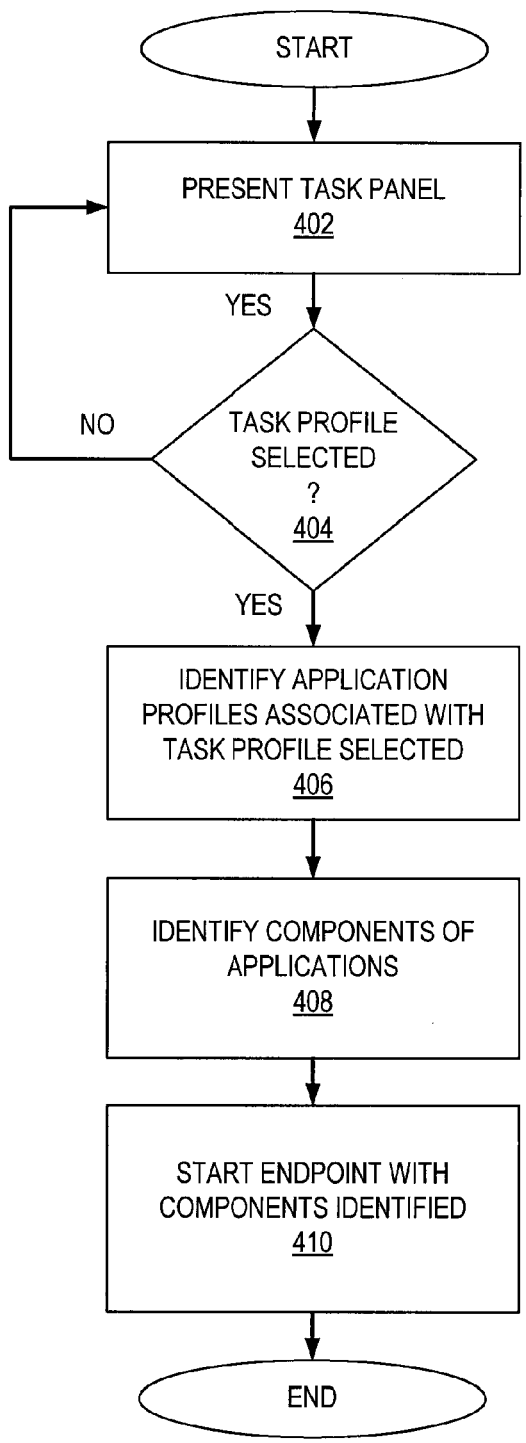
FIG. 4 is a flowchart illustrating steps performed by the startup module according to one embodiment.

FIG. 4 is a flowchart 400 illustrating steps performed by the startup module 108 according to one embodiment. Other embodiments perform the illustrated steps in different orders, and/or perform different or additional steps. Additionally, in other embodiments, some or all of the steps may be performed by different modules.

The startup module 108 presents 402 the user with a task panel. The task panel includes the names of one or more task profiles stored in the task profile database 112. If the user selects 404 a task profile from the task panel, the endpoint 100 enters efficient mode and the startup module 108 analyzes the task profile selected to identify 406 the application profiles associated with the task profile. The startup module 108 uses the identified application profiles to identify 408 the components of the applications used to perform the task associated with the selected task profile. The startup module 108 starts 410 the endpoint 100 with the identified components.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the inventive subject matter.

Accordingly, this disclosure is intended to be illustrative, but not limiting, of the scope of the invention, which is set forth in the following claims.

The invention claimed is:

1. A computer-implemented method for creating a task profile to efficiently use resources of an endpoint, the method comprising:
    defining application profiles for a plurality of applications stored on the endpoint, an application profile identifying components on the endpoint associated with an application with which the application profile is associated;
    monitoring, while the endpoint is in a learning mode in which the plurality of applications are accessible by a user, which applications of the plurality applications on the endpoint are accessed by the user to perform a task;
    identifying a subset of the plurality of applications on the endpoint accessed by the user during learning mode to perform the task, the subset of applications less than the plurality of applications;
    creating a task profile associated with the task, the task profile associated with the application profiles for the subset of applications accessed by the user during learning mode to perform the task;
    storing the task profile;
    receiving a request from the user to perform the task associated with the task profile;
    examining the application profiles associated with the task profile to determine the components identified by the application profiles; and
    configuring the endpoint, while in an efficient mode and not in the learning mode, to execute the determined components identified by the application profiles and to not execute components of applications that are not identified by the application profiles associated with the task profile.

2. The method of claim 1, wherein defining the application profiles comprises, for each application profile:
    identifying one of the plurality of applications installed on the endpoint;
    obtaining the application profile for the identified application; and
    storing the application profile.

3. The method of claim 2, wherein obtaining the application profile for the identified application comprises:
    requesting the application profile from a remote server connected to the endpoint via a network.

4. The method of claim 1, wherein defining the application profiles comprises, for each application profile:
    observing operation of one of the plurality of applications to create information identifying components associated with the application;
    generating the application profile using the information created by observing the operation of the application; and
    storing the application profile.

5. The method of claim 1, further comprising:
    graphically presenting an interface to the user, the interface enabling the user to edit characteristics of the task profile.

6. The method of claim 1, wherein each of the application profiles comprises a virtualization layer that can be executed by the endpoint and wherein configuring the endpoint comprises:
    configuring the endpoint to execute virtualization layers of the one or more application profiles associated with the task profile.

7. The method of claim 1, wherein the configuring comprises:
    executing a virtual machine on the endpoint, the virtual machine configured to execute the components identified by the application profiles associated with the task profile.

8. A computer program product having a non-transitory computer-readable storage medium having computer-executable code for creating a task profile to efficiently use resources of an endpoint, the computer-executable code comprising:
    an application profile module configured to define application profiles for a plurality of applications stored on the endpoint, an application profile identifying components on the endpoint associated with an application with which the application profile is associated;
    a task profile module configured to:
        monitor, while the endpoint is in a learning mode in which the plurality of applications are accessible by a user, which applications of the plurality applications on the endpoint are accessed by the user to perform a task;
        identify a subset of the plurality of applications on the endpoint accessed by the user during learning mode to perform the task, the subset of applications less than the plurality of applications;
        create a task profile associated with the task, the task profile associated with the application profiles for the subset of applications accessed by the user during learning mode to perform the task;
        store the task profile; and
    a startup module configured to:
        receive a request from the user to perform the task associated with the task profile;
        examine the application profiles associated with the task profile to determine the components identified by the application profiles; and
        configure the endpoint, while in an efficient mode and not in the learning mode, to execute the determined components identified by the application profiles and to not execute components of applications that are not identified by the application profiles associated with the task profile.

9. The computer program product of claim 8, wherein the application profile module is further configured to:
    identify one of the plurality of applications installed on the endpoint;
    obtain the application profile for the identified application; and
    store the application profile.

10. The computer program product of claim 9, wherein the application profile module is further configured to:
    request the application profile from a remote server connected to the endpoint via a network.

11. The computer program product of claim 8, wherein the application profile module is further configured to:
    observe operation of one of the plurality of applications to create information identifying components associated with the application;
    generate the application profile for the application using the information created by observing the operation of the application; and
    store the application profile.

12. The computer program product of claim 8, the task profile module is further configured to:

graphically present an interface to the user, the interface enabling the user to edit characteristics of the task profile.

13. The computer program product of claim 8, wherein each of the application profiles comprises a virtualization layer that can be executed by the endpoint and the startup module is further configured to:

configure the endpoint to execute virtualization layers of the one or more application profiles associated with the task profile.

14. The computer program product of claim 8, wherein the startup module is further configured to:

execute a virtual machine on the endpoint, the virtual machine configured to execute the components identified by the application profiles associated with the task profile.

15. A computer system for creating a task profile to efficiently use resources of the system, the system comprising:

a computer processor; and a non-transitory computer-readable storage medium storing computer program modules configured to execute on the computer processor, the computer program modules comprising:

an application profile module configured to define application profiles for a plurality of applications stored on the system, an application profile identifying components on the system associated with an application with which the application profile is associated;

a task profile module configured to:

monitor, while the system is in a learning mode in which the plurality of applications are accessible by a user, which applications of the plurality applications on the system are accessed by the user to perform a task;

identify a subset of the plurality of applications on the system accessed by the user during learning mode to perform the task, the subset of applications less than the plurality of applications;

create a task profile associated with the task, the task profile associated with the application profiles for the subset of applications accessed by the user during learning mode to perform the task;

store the task profile; and a startup module configured to:

receive a request from the user to perform the task associated with the task profile;

examine the application profiles associated with the task profile to determine the components identified by the application profiles; and configure the system, while in an efficient mode and not in the learning mode, to execute the determined components identified by the application profiles and to not execute components of applications that are not identified by the application profiles associated with the task profile.

16. The computer system of claim 15, wherein the application profile module is further configured to:

identify one of the plurality of applications installed on the system;

obtain the application profile for the identified application; and store the application profile.

17. The computer system of claim 16, wherein the application profile module is further configured to:

request the application profile from a remote server connected to the system via a network.

18. The computer system of claim 15, wherein the application profile module is further configured to:

observe operation of one of the plurality of applications to create information identifying components associated with the application;

generate the application profile for the application using the information created by observing the operation of the application; and store the application profile.

19. The computer system of claim 15, the task profile module is further configured to:

graphically present an interface to the user, the interface enabling the user to edit characteristics of the task profile.

20. The computer system of claim 15, wherein each of the application profiles comprises a virtualization layer that can be executed by the system and the startup module is further configured to:

configure the system to execute virtualization layers of the one or more application profiles associated with the task profile.

\* \* \* \* \*